United States Patent [19]
Kurokawa

[11] 3,962,678
[45] June 8, 1976

[54] LIGHTING APPARATUS

[75] Inventor: Masayuki Kurokawa, Tokyo, Japan

[73] Assignee: Yamagiwa Electric Co. Ltd., Tokyo, Japan

[22] Filed: June 10, 1974

[21] Appl. No.: 477,742

[30] Foreign Application Priority Data

| May 1, 1974 | Japan | 49-50195 |
| May 1, 1974 | Japan | 49-50196 |
| May 1, 1974 | Japan | 49-50197 |

[52] U.S. Cl. ............... 240/81 BD; 240/52 R; 240/73 BA
[51] Int. Cl.² ............... F21S 1/12; F21S 3/10
[58] Field of Search ......... 240/52.15, 81 P, 81 BD, 240/81 BS, 81 BA, 81 BC, 73 BA, 8.18, 11.2 R, 52 R, 89, 10 R; 248/160, 159, 176

[56] References Cited
UNITED STATES PATENTS

| 2,466,176 | 4/1949 | Kunisch | 240/81 BS X |
| 3,584,822 | 6/1971 | Oram | 240/52 R |
| 3,666,938 | 5/1972 | Dolega | 240/81 BD X |
| 3,689,763 | 9/1972 | Hamburger | 240/10 R X |
| 3,711,695 | 1/1973 | Orbach | 240/81 BD X |

Primary Examiner—Richard A. Wintercorn
Attorney, Agent, or Firm—William A. Drucker

[57] ABSTRACT

There is provided a lighting apparatus particularly adapted for use as a stand type lamp which comprises a light assembly composed of an electric bulb and a shade; and a stand essentially constituted by a rubber-made elongated stem member of a generally rectangular or oblong cross-section carrying said light assembly on the upper end thereof. Said stem member is characterized by that it is formed with a plurality of annular grooves of generally U-shaped cross-sections over the whole periphery thereof each of which extends transversely with respect to the longitudinal axis of said stem member and all of which are arranged in parallel and successive relation at regular intervals substantially along the whole length of the stem member. At least one flexible bar made of metal such as annealed aluminum or the like is inserted through said stem member along the longitudinal axis thereof.

5 Claims, 10 Drawing Figures

FIG. 5 FIG. 4
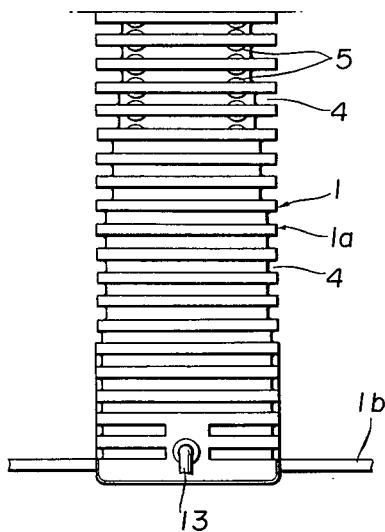
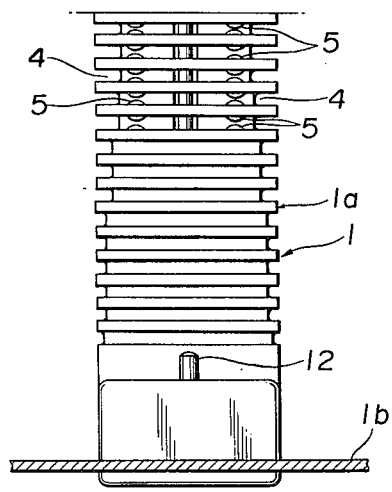
FIG. 6
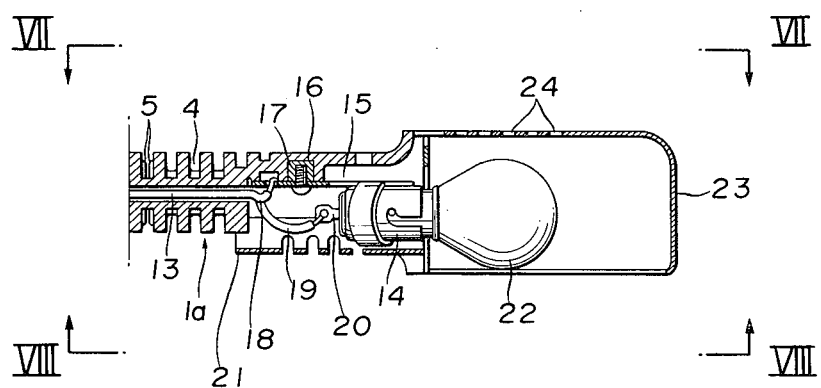

3,962,678

LIGHTING APPARATUS

BACKGROUND OF THE INVENTION

This invention relates to a lighting apparatus whose light assembly may be freely adjustable in position and illuminating direction, and which may also excellently serve for ornamental purposes.

Usually stand type lamps and the like lighting apparatus are necessary to adjust in position and/or illuminating direction according to their uses and purposes. Further, stand type lamps and the like are intended to be used at such places as on desks or tables, and therefore are also required to have a good look enough to serve as a kind of ornament. However, conventional apparatus of this kind fail to perfectly meet with these requirements.

BRIEF SUMMARY OF THE INVENTION

This invention has been devised in order to improve the aforesaid circumstances, and it is an object of the invention to provide a lighting apparatus particularly adapted for use as a stand type lamp which may exhibit high flexibility or pliancy enough to permit the free control of its light assembly in any position and/or illuminating direction. A further object of the invention is to provide a lighting apparatus which has a stem member completely free from becoming biased or inclined in a particular direction, but permits smooth bending thereof, and which may be simply made at low costs.

BRIEF DESCRIPTION OF DRAWINGS

An embodiment of the lighting apparatus according to the present invention is described now with reference to the accompanying drawings, wherein:

FIG. 6 is a longitudinal section showing a light assembly of the embodiment.

DETAILED DESCRIPTION OF THE INVENTION

Figure 1:
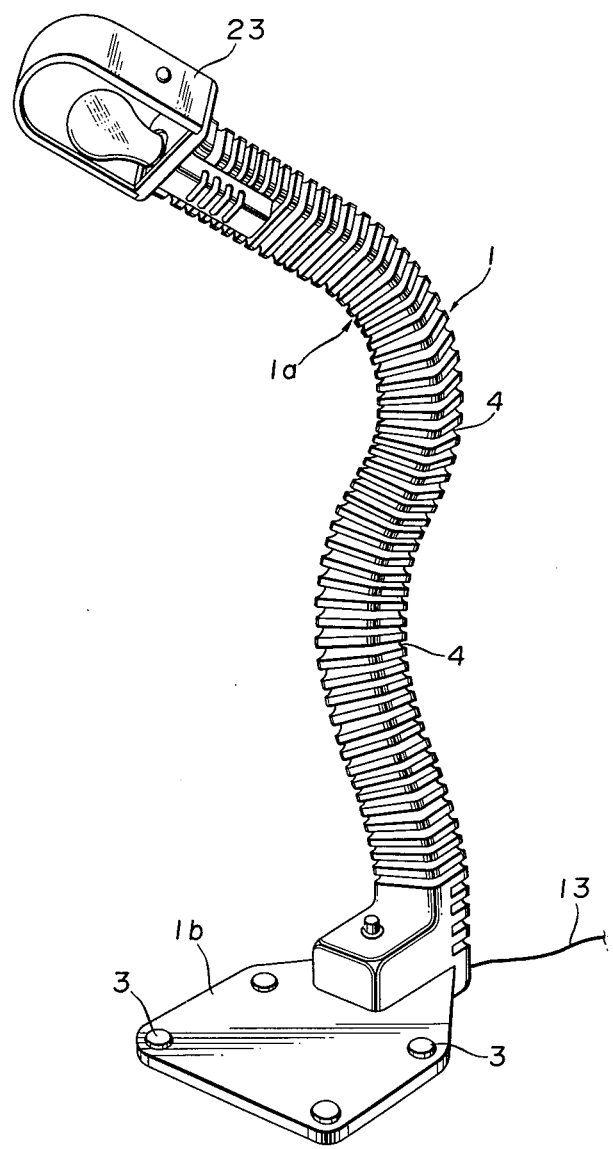
FIG. 1 is a perspective view showing a preferred embodiment of the present invention.
Figure 2:
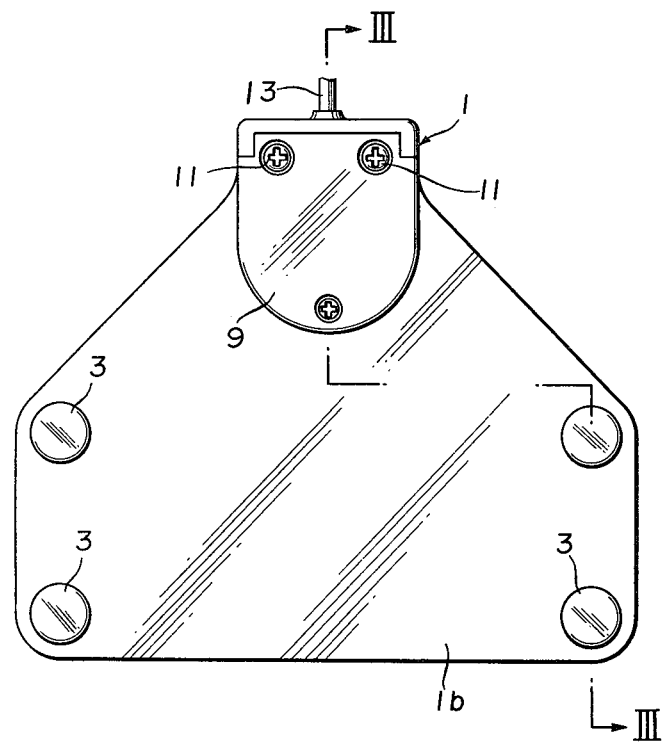
FIG. 2 is a bottom plan view showing a stand used in the preferred embodiment.
Figure 3:
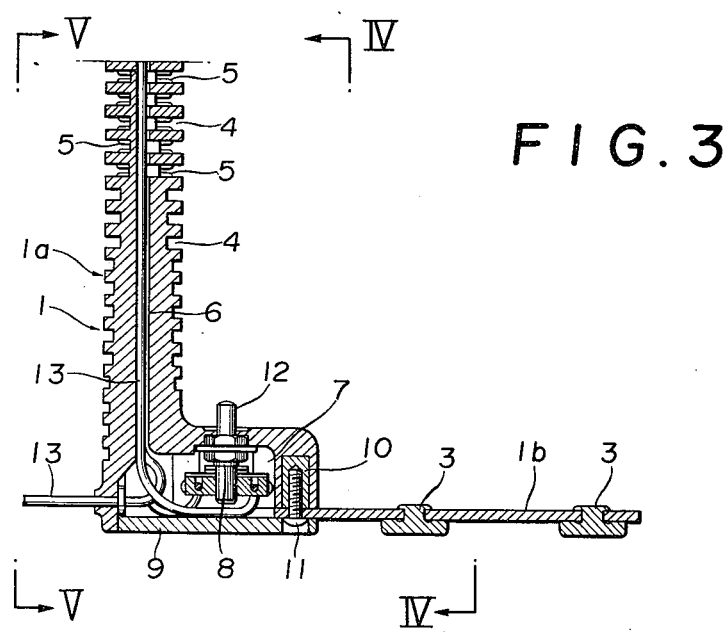
FIG. 3 is a sectional view taken along line III — III of FIG. 2, FIGS. 4 and 5 are views taken from the directions of lines IV — IV and V — V of FIG. 3 respectively.
Figure 7:
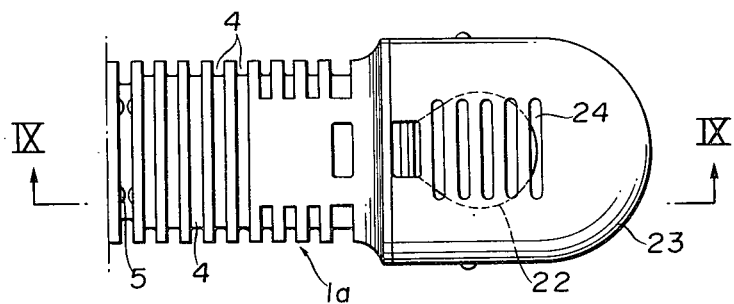
FIGS. 7 and 8 are views taken from the directions of lines VII — VII and VIII — VIII of FIG. 6 respectively.
Figure 8:
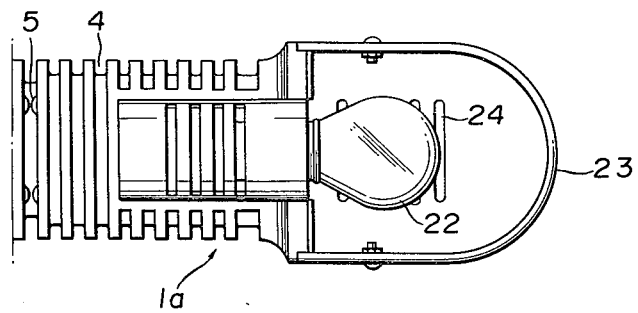
Figure 9:
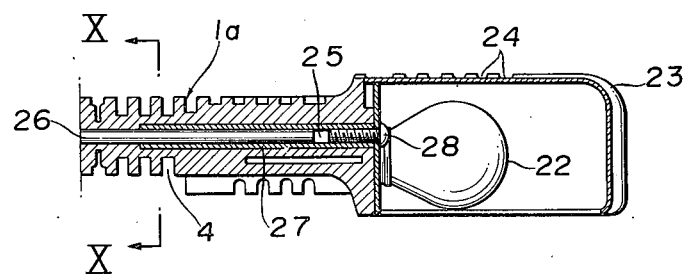
FIG. 9 is a sectional view taken along line IX — IX of FIG. 8.
Figure 10:
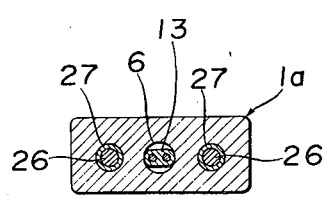
FIG. 10 is a sectional view taken along line X — X of FIG. 9.

Description will be made with reference to the accompanying drawings. Reference numeral 1 designates a stand which comprises a stem member 1a made of synthetic rubber, the lower end of which is secured to a plate-like base member 1b. Fixed to the underside of the base member 1b are foot members 3. Said stem member 1a is of an elongated configuration having a generally rectangular or oblong cross-section. Formed over the outer periphery of the stem member 1a are a number of annular grooves 4 of U-shaped sections which each extend transversely with respect to the axis of the stem member 1a and all are arranged in parallel and successive relation at regular intervals along the whole length of the stem member 1a. The grooves 4 are divided in two or more groups 4a, 4b, 4c ... 4n of depths different to one another: The grooves of the groups 4b, 4c near the upper and lower ends of the stem member have depths smaller than those of the group 4a at the central portion of the stem member 1a so that the whole grooves are gradually deeper toward the central portion of the stem member 1a. The grooves of a deeper group or groups are each provided with two stoppers 5 on each of the both walls thereof in the form of protuberances. Said two stoppers 5 on each wall are positioned on opposite sides of the wall with respect to the longitudinal axis of the stem member 1a, so that stoppers on the both walls of each groove are in facing relation to each other. Thus, these stoppers serve to prevent the stem member 1a from being excessively flexed laterally. A hole 6 is formed through the longitudinal axis of the stem member 1a for receiving an electric cord therethrough, while a downwardly opening recess 7 is provided within the lower portion of the stem member 1a for accomodating a switch 8. To cover the opening of the recess 7, provided under the stem member is a cover 9 which is fixed to the stem member 1a by means of tapped parts 10 embedded in the stem member and screws 11 screwed in the tapped parts 10. Said switch has a lever 12 protruding outwardly of the lower portion of the stem member 1a. An electric cord 13 is inserted into the recess 7 through the lower portion of the stem member 1a, with one of its cores connected to the switch 8 and which cord further passes through the hole 6 to lead to the upper end of the stem member 1a. The upper end of the stem member 1a is provided with a socket 14 in a manner that one core wire 18 of the cord 13 is connected to an electrode plate 15 which is secured to a terminal of the socket 14 by a screw 17 engaged in a tapped part 16 embedded in the stem member 1a, while the other core wire 19 connected to the other terminal of the socket 14. A socket cover 21 is provided for covering the socket 21. A downwardly opening shade 23 is mounted on the upper end of the stem member 1a to cover a light bulb 22 mounted on the socket 14. This portion is referred to as a light assembly in the specification. Over the exterior of the shade 23 are formed a plurality of slits 24. Through the stem member 1a are provided a pair of holes 25 for receiving bars 26 made of aluminum therethrough which are diametrically opposed with respect to the hole 6 and extend substantially along the whole length of the stem member 1a and through which holes there are inserted aluminum bars 26 from openings of the holes at the upper end of the stem member 1a. Further, into each hole 25 is inserted an aluminum pipe 27 of such a length as to extend along an uppermost portion of the hole 25 only. Then, the upper opening of the hole 25 is closed by a screw 28 fitted into the same hole. Said aluminum bars 26 are annealed and therefore are very flexible and not easily broken when bent.

With the above-mentioned arrangement, description is made of how to use the present apparatus: First, the free end of the cord 13 exposed outside of the stem member is connected to a power source, and then the switch may be switched on or off by turning the lever 12 so that the bulb is lighted or put out. By virtue of the arrangement of annular grooves of U-shaped sections in parallel and successive relation over the periphery of the rubber-made stem member 1a which carries a bulb 22 and its related parts on the upper end thereof, the apparatus according to the invention presents a whole appearance resembling a cobra and therefore gives a gorgeous impression to a user, and is able to effectively fulfill its dual functions as both a lighting apparatus and an ornament when put on a desk or the like. Further, the use of two aluminum bars 26 inserted through the stem member 1a coacts with the provision of the annual grooves 4 over the whole periphery of the stem member 1a which is made of flexible rubber, to bring about the following important feature: The stem member 1a is able to be flexed in any directions and remain stationary in any position into which it has been flexed, thus making it possible to freely adjust the position and lighting direction of the bulb 22 so that illumination in any directions is feasible with high efficiency. Further, by virtue of the arrangement of annual grooves 4 which gradually become deeper from the both ends of the stem member 1a toward the central portion thereof, the stem member 1d may be easily bent particularly at the central portion thereof thus to ensure smooth change of the illuminating direction of the apparatus. Still further, the stoppers 5 on opposite walls of each groove 4 are positioned so as to hit against each other thereby moderately preventing the stem member 1a from being excessively bent in one direction. This preventing function is further enhanced and perfected by the arrangement of two holes 25 in diametrically opposed relation with respect to the central hole 6. Thus, well-balanced bending of the stem member 1a may be fully ensured which is free from such a defect that the stem member is apt to get inclined exclusively in a particular direction. Once bent, the stem member can stably keep itself in any posture.

As described in the foregoing, the present invention provides a lighting apparatus which has a stand comprising a rubber-made elongated stem member of a generally rectangular or oblong cross-section having the whole outer periphery thereof provided with a plurality of annular grooves of U-shaped sections which each extend transversely with respect to the longitudinal axis of the stem member and all are arranged in parallel and successive relation at regular intervals along the whole length of the stem member; a pair of aluminum bars arranged in diametrically opposed relation with respect to the longitudinal axis of the stem member and extending parallel with said axis through the same member; a light assembly provided at the top end of the stem member; and a cord extending from said light assembly to the lower end of the stem member through a central hole formed along the longitudinal axis of the stem member. The lighting apparatus of this arrangement presents a whole appearance resembling a strong live cobra which is known for its deadly poison, and therefore will give an intense impression to those who look at it, as if it were a cobra with its head raised. In addition, looking very gorgeous, the lighting apparatus is able to serve for the double purposes of both a lighting apparatus and an ornament. The combination use of a rubber-made stem member formed with plural annular grooves over the whole periphery thereof and annealed aluminum bars inserted through the stem member gives high flexibility to the stem member, thus much facilitating bending of the stem member to adjust the position and illuminating direction of the light assembly at the top end thereof. Further, neither of the cord and the paired aluminum bars is exposed to the outside but provided within the stem member, which results in a fine look of the apparatus. In addition, the apparatus according to the invention may be of a very simple construction since the stem member consists essentially solely of a rubber-made elongated member and flexible annealed bars inserted through said member, thus ensuring much less costs for the manufacture thereof.

Having described a specific embodiment of the invention, it is believed obvious that the invention be not limited by any of the details of description, unless otherwise specified, but rather be construed broadly within its spirit and scope as set out in the accompanying claims.

What I claim is:

1. In a lighting apparatus particularly adapted for use as a stand type lamp comprising: a light assembly comprising a socket; a light bulb; a shade; and a stand including an elongated stem member having two ends and a central portion carrying said light assembly on the upper end thereof and formed with a plurality of annular grooves of generally U-shaped cross-section over the periphery thereof, each groove extending radially with respect to the longitudinal axis of said stem member and all grooves arranged in parallel and successive relation at regular intervals substantially along the whole length of the stem member; and at least one flexible metal bar penetrating through said stem member along the longitudinal axis thereof which holds the stem member in selected positions, the improvement in which said annular grooves become gradually deeper toward at least one end of the stem member from the central portion thereof.

2. In lighting apparatus as claimed in claim 1, the improvement in which said annular grooves are divided into at least three groups, said grooves near at least one end of the stem member being shallower than the grooves at the central portion thereof.

3. In lighting apparatus as claimed in claim 1, the improvement further comprising stop means provided on opposite walls of each of said annular grooves in facing relation to each other and positioned so as to hit against each other for preventing the stem member from being excessively flexed in one direction.

4. In lighting apparatus as claimed in claim 1, the improvement including an electric cord having one upper end thereof connected to said light assembly and the other end passing through the lower end of said stem member.

5. In lighting apparatus as claimed in claim 1, the improvement in which said stem member is of a generally rectangular cross-section.

* * * * *